United States Patent [19]

Imamura et al.

[11] Patent Number: 4,703,380
[45] Date of Patent: Oct. 27, 1987

[54] PERPENDICULAR MAGNETIC HEAD

[75] Inventors: Tatsuo Imamura; Hiroyuki Yamamoto, both of Hachioji; Yutaka Yunoki, Kunitachi, all of Japan

[73] Assignee: Olympus Optical Co., Ltd., Japan

[21] Appl. No.: 696,702

[22] Filed: Jan. 31, 1985

[30] Foreign Application Priority Data

Feb. 1, 1984 [JP] Japan ................... 59-16795

[51] Int. Cl.$^4$ .................... G11B 5/265; G11B 5/29
[52] U.S. Cl. ..................... 360/121; 360/105
[58] Field of Search ............ 360/125, 121, 105

[56] References Cited

U.S. PATENT DOCUMENTS 4,156,882 5/1979 Delagi ..................... 360/126
4,317,148 2/1982 Chi ....................... 360/125 X
4,385,334 5/1983 Yanagida .

FOREIGN PATENT DOCUMENTS 56-13514   2/1981  Japan .
5885913   11/1981  Japan .
56-169212 12/1981  Japan .
57-203216 12/1982  Japan .

OTHER PUBLICATIONS

Patent Abstract of Japan, vol. 5, No. 60, Apr. 23, 1981, p. 100, P 58 (P-58) (732); & JP-A-56-13514 (Olympus) 9.2.81.
Patent Abstract of Japan, vol. 6, No. 229, Nov. 16, 1982, p. (P-155)(1107); & JP-A-57-130221 (Suwa Seikosha) 12.8.1982.
Patent Abstract of Japan, vol. 5, No. 154, Sep. 29, 1981, p. (P-82) (826); & JP-A-87216 (Tokyo Shibaura) 15.7.1981.
Patent Abstract of Japan, vol. 6, No. 112, Jun. 23, 1982, p. (P-124) (990); & JP-A-57-40718 (Suwa Seikosha) 6.3.1982.
Patent Abstract of Japan, vol. 8, No. 23, Jan. 31, 1984, p. (P-251) (1460); & JP-A-58-179905 (Matsushita) 21.10.1983.
Electronics & Nucleonics Dictionary, Third Edition, pp. 320, 380 & 463, John Markus, McGraw-Hill Book Company.
American Institute of Physics Handbook, pp. 5-169; 5-174 & 5-180, McGraw-Hill Book Company, Inc.

Primary Examiner—A. J. Heinz
Attorney, Agent, or Firm—Ostrolenk, Faber, Gerb & Soffen

[57] ABSTRACT

A perpendicular magnetic head includes a main pole suitable for use exclusively in recording information signals which is made of a soft magnetic film having the high saturation magnetization and another main pole suitable for use exclusively in reproducing recorded signals which is made of a soft magnetic film having the high initial permeability, both being disposed at separate positions.

30 Claims, 21 Drawing Figures

PERPENDICULAR MAGNETIC HEAD

BACKGROUND OF THE INVENTION

The present invention relates to a perpendicular magnetic head, and more particularly, such a magnetic head for recording information signals on a perpendicular magnetic recording medium and for reproducing signals recorded on the recording medium.

Figure 1:
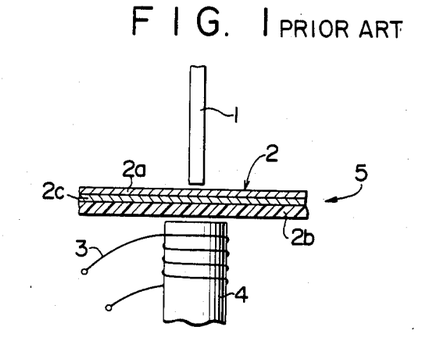
FIG. 1 is a front view illustrating an example of a conventional perpendicular magnetic head.

Recently, a magnetic head 5 of the auxiliary magnetic pole excitation type as shown in FIG. 1 is considered to have bright future prospects to be used extensively as a perpendicular magnetic head. The magnetic head 5 includes a main magnetic pole 1 formed of a magnetic thin film having high permeability and an auxiliary magnetic pole 4 formed of a magnetic substance block having high permeability on which a winding 3 is provided. Both poles are arranged so as to interpose a magnetic recording medium 2 therebetween. To record information signals, the main magnetic pole 1 is magnetized by a signal current flowing through the winding 3 around the auxiliary magnetic pole 4. As a result, a magnetic layer 2a which extends through the medium of a high permeability layer 2c on a base film 2b of the recording medium 2 is perpendicularly magnetized by the perpendicular magnetic field which develops by the magnetization of the main magnetic pole 1. To reproduce recorded signals, the main magnetic pole 1 is magnetized by the magnetic field which has been developed by the perpendicular magnetization of the recording medium 2 and signal voltages which are induced in the winding 3 by a change in the magnetization of the main magnetic pole 1 are picked up.

The magnetic head 5 features includes a strong interaction between the main magnetic pole 1 and the recording medium 2. Specifically, the magnetic flux from the main magnetic pole 1 is drawn into the recording medium so that only the perpendicular magnetic flux at the tip end of the main magnetic pole 1 is greatly intensified. Since the spread of the magnetic flux is limited by thickness of the main magnetic pole 1, the sharp perpendicular magnetic field is developed regardless of recording levels. In addition, the magnetic head 5 reliably and quite desirabley provides the perpendicular magnetic field to the surface of the magnetic layer 2a of the recording medium 2 practically independently of the positioned accuracy of the center axes position of both the magnetic poles 1, 4.

However, to optimize the recording operation, on one hand, and the reproducing operation, on the other hand, requires different hardware in each case. Since the recording and reproducing operations are performed with the same magnetic head 5, it is difficult to improve their sensitivities. To improve the recording sensitivity, the main magnetic pole 1 should be formed of a soft magnetic film having the high saturation magnetization. To improve the reproducing sensitivity, on the other hand, the main magnetic pole 1 should be formed of a soft magnetic film having a high initial permeability $\mu i$.

Figure 2A:
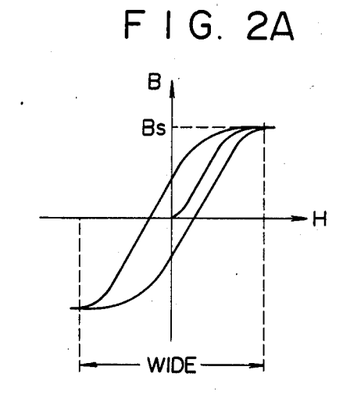
FIGS. 2A and 2B are diagrams of the magnetization curves (hysteresis loops) showing magnetization characteristics in recording and reproducing processes, respectively.
Figure 2B:
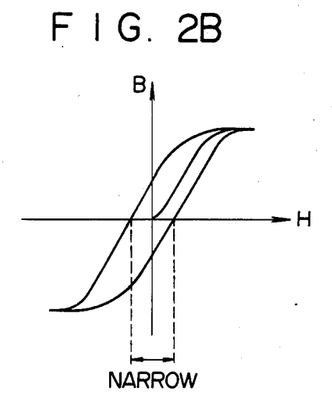

This can be described with reference to the magnetization curves (hysteresis loops), shown in FIGS. 2A and 2B. FIG. 2A shows the reaction range in the main pole 1 (indicated by the arrow marked "WIDE") to the intensity of the magnetic field during a recording operation mode. FIG. 2B shows the reaction range (indicated by the arror marked "NARROW") to the intensity of the magnetic field induced by the magnetic recording medium 2 during the reproducing operation mode.

As can be seen from FIG. 2A, in the recording mode, relatively wide range of the magnetic field are practically applied by a recording current corresponding to information signals to be recorded, and the magnetic field is applied to the main pole 1 for inducing a concentrated magnetic flux from it so as to perform the perpendicular recording. Therefore, the higher the saturation magnetization (i.e. the saturated magnetic flux density Bs shown in FIG. 2A) of the main pole 1, the higher the strength of the magnetic recording is. On the other hand, in the reproducing process, the intensity of the magnetic field can take merely relatively narrow range as shown in FIG. 2B, since the magnetic field emanates from the magnetic recording medium 2 on which information signal were previously recorded. Therefore, the initial permeability $\mu i$ (i.e. the gradient of the curve in the region of low intensity of the magnetic field shown in FIG. 2B) of the main pole 1 should be high enough for obtaining a high reproducing sensitivity, whereas the saturation magnetization (Bs) can be negligible in the reproducing process. Accordingly, it is best if the main magnetic pole 1 is formed of a substance having both a high saturation magnetization Bs and also having a high initial permeability $\mu i$. However, it is difficult, in practice, to provide both simultaneously.

By way of example, an amorphous film made of an alloy of three elements of Co (Cobalt)-Zr (Zirconium)-Nb (Niobium) has a tendency in which when the Co content increases, the saturation magnetization Bs is raised and the initial permeability $\mu i$ decreases.

In view of the foregoing, conventionally the recording and reproducing magnetic heads are separately provided for carrying out exclusively each function. To this end, it has been proposed to provide the magnetic head shown in FIG. 3. With this head, the recording and reproducing operations use two magnetic heads, an auxiliary pole exciting type recording head 5 and a well known ring type reproducing head 6 with a winding 8 coiled around a ring-shaped magnetic body 7. With the described magnetic head, when the recording density of information is not very high, the ring type head 6 has the good resolving power and the high reproducing sensitivity to read recorded signals satisfactorily. However, when data is recorded at a high density of more than 100 KBPI ($10^5$ Bit Per Inch), it is difficult to read recorded signals with the ring type head 6. Presently, since a gap width t of the head 6 is approximatel 0.2 $\mu m$ at the minimum, it is impossible, in principle, to resolve and reproduce a recorded bit of less than that width and the resolving and reproducing sensitivity is only on the level of nearly 0.3 ~0.4 $\mu m$. Therefore, it is necessary for the recording operation of density more than 100 KBPI to employ specifically a reproducing head for exclusive use which is different from the head 6.

Figure 3:
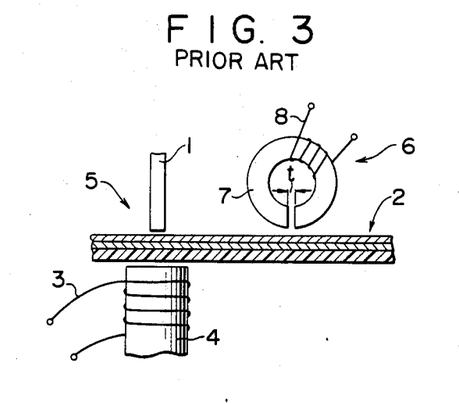
FIG. 3 is a front view illustrating another example of a conventional perpendicular magnetic head.

Furthermore, there have been proposed other conventional perpendicular magnetic heads disclosed in (1) Japanese Laid-Open Patent Application No. 169,212/1981, (2) Japanese Laid-Open Patent Application No. 203,216/1982 and (3) Japanese Laid-Open Patent Application No. 13,514/1981. The first patent application discloses a magnetic head based fundamentally on using the ring type head 6 and therefore has the disadvantage mentioned above. The second patent application discloses a magnetic head in which a plurality of main magnetic poles are arranged at regular intervals on a rotary member such that video tracks are formed at high speed by rotating the rotary member in a direction perpendicular to direction of travel of the video tape. However, in this magnetic head, although the plurality of main magnetic poles are formed in a unitary body, the recording and reproducing operations are not separated. The last patent application discloses a magnetic head proposed by similar to the present invention in which both recording and reproducing heads are united and a main magnetic pole of the magnetic head is changeable in its thickness between recording and reproducing operations to improve accuracy of the azimuth adjustment and the resaturation resolving-power in the reproducing operation.

SUMMARY OF THE INVENTION

In view of the foregoing, it is an object of the present invention to provide a perpendicular magnetic head which perpendicularly records information signals on a magnetic recording medium which extends perpedicularly to it. The head reproduces signals perpendicularly recorded in most efficient manner.

Specifically, the perpendicular magnetic head of the present invention comprises a main recording pole which is formed of a soft magnetic film having the high saturation magnetization and a main reproducing pole which is formed of a soft magnetic film having the high initial permeability.

According to the present invention, the main recording and reproducing poles are separately provided, the main recording pole is formed of a soft magnetic film with high saturation magnetization and the main reproducing pole is formed of a soft magnetic film with high initial permeability. Therefore both recording and reproducing operations can be efficiently carried out in the most optimum manner.

DESCRIPTION OF PREFERRED EMBODIMENTS

Figures 4, 5:
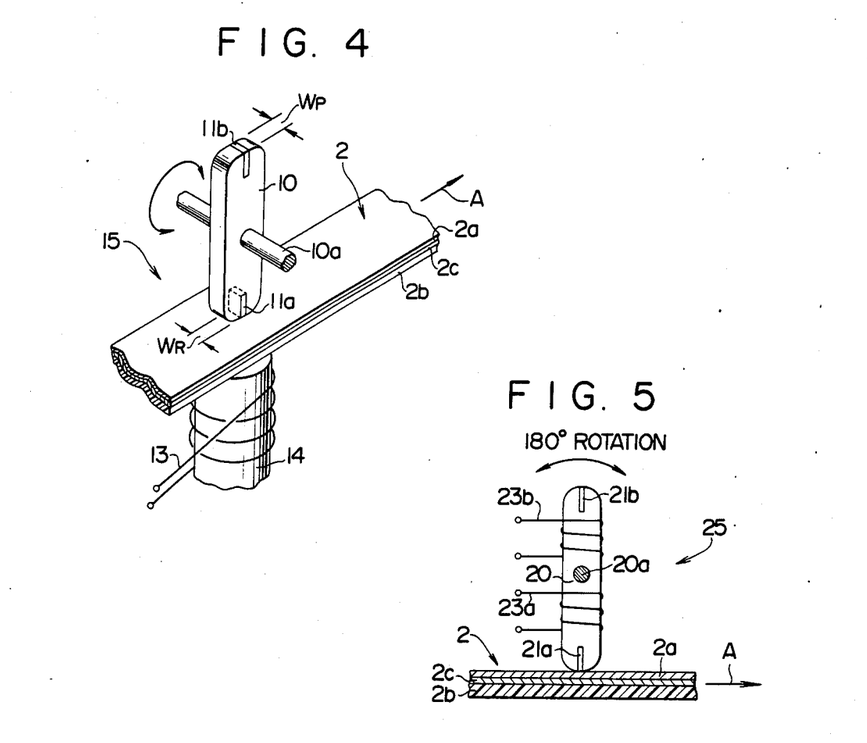
FIG. 4 is a perspective view of a perpendicular magnetic head according to a first embodiment of the present invention.
FIG. 5 is a front view of a perpendicular magnetic head according to a second embodiment of the present invention.

Referring now to FIG. 4, a perpendicular magnetic head 15 of the present invention, which includes a main recording pole 11a and a main reproducing pole 11b which are both provided on a substrate 10 in a unitary manner. The substrate 10 is rotatably mounted on a rotary shaft 10a. A magnetic head of the auxiliary pole exciting type in which an auxiliary pole 14 made of a magnetic substance block having a high permeability around which a winding 13 is coiled is arranged so as to sandwich a perpendicularly extending magnetic recording medium 2 (hereinafter referred to as a recording medium) between the substrate 10 and the auxiliary pole 14.

The recording medium 2 has a magnetic layer 2a extending through the medium and over a high permeability layer 2c which is atop a base film 2b, similarly to the recording medium shown in FIG. 1. Therefore, the same reference symbols are used for designating corresponding elements. The substrate 10 comprises a wear-resistant material such as non-magnetic ferrite and ceramic and has an elongate shape. The main poles 11a, 11b made of a soft magnetic film are arranged on the substrate 10 at longitudinally opposite ends thereof, respectively. The ends are symmetrical with respect to the axis of the rotary shaft 10a which passes centrally through in the substrate 10. The main pole 11a is made of a soft magnetic film of a high saturated magnetic flux density and the main pole 11b is of a soft magnetic film having a high initial permeability. The substrate 10 is rotatable about the axis of the rotary shaft 10a. During recording, the main pole 11a, as shown in FIG. 4, is in contact with the surface of a magnetic layer 2a of the recording medium 2 and is located opposite to the auxiliary pole 14 with the recording medium 2 separating the two poles from one another. During a reproducing process, the main pole 11b is in contact with the surface of the magnetic layer 2a and assures the juxtaposed relationship with respect to the auxiliary pole 14. Thus, both the main poles 11a, 11b are switched between the recording and reproducing positions by rotating the substrate 10 through 180°.

In recording using the magnetic head 15, as shown in FIG. 4 the main pole 11a is positioned downwardly so as to be in abutment with the magnetic layer 2a and then a current for magnetic recording of signals is passes through the winding 13. Thereby, the main pole 11a is magnetized by the magnetic field produced by the auxiliary pole 14 to produce a sharp perpendicular magnetic field at the tip end of the main pole 11a. As a result, the magnetic layer 2a is magnetized perpendicularly to the running direction arrow A.

In a reproducing mode, the substrate 10 is rotated through 180° from the recording position to position the main pole 11b downwardly to contact the recording medium 2. The recording medium 2 is run horizontally in the longitudinal direction of arrow A. Thus, the main reproducing head 11b is magnetized by the magnetic fields which are produced by the perpendicular magnetization recorded on the recording medium 2. Voltages are induced by a change of the magnetization of the main pole 11b as the tape passes by are sensed by the winding 13 which delivers so-called reproduced signals.

With the perpendicular magnetic head 15, advantage can be taken of the good magnetic recording and reproducing properties in each case.

In addition, the magnetic head is simply constructed and easy to manufacture.

Now, the characteristics of and the relationship between track widths for the recording and reproducing poles will be described. Assuming that the recording track width of the main pole 11a is $W_R$, the reproducing track width of the main pole 11b is $W_P$, a track width standard W on the recording medium 2 is 60 μm and a guard band is 40 μm. A conventional, horizontal magnetization type recording head has the relation $W_R < W$, whereas it is possible for the perpendicular recording to have the relation $W_R = W$ because of no leakage of recorded flux in the direction of track width. However, it is preferred that a reproducing track width $W_P$ has the relation $W_P > W_R$ because of easiness of tracking in the reproducing operation.

A perpendicular magnetic head 25 according to a second embodiment of the present invention is shown in FIG. 5 which has a magnetic head of the exciting type without an auxiliary pole. The magnetic head 25, as in the first embodiment shown in FIG. 4, has a main recording pole 21a and a main reproducing pole 21b at longitudinally opposite tip ends of an elongated substrate 20, respectively, and symmetric with respect to a rotational axis 20a. The main pole 21a is provided with a winding 23a for applying a signal current for recording signals and the main pole 21b on the substrate 20 is provided with a winding 23b for picking up a voltage induced by magnetization of a recording medium 2. These windings 23a, 23b are not necessarily required to be separately coiled and may be provided such that both are continuously wound and an intermediate tap therebetween is provided as a common terminal.

As before, the main pole 21a is made of a soft magnetic film having high saturation magnetization and the main pole 21b is made of a soft magnetic film with a high initial permeability. Since the substrate 20 which supports the main poles 21a, 21b is rotatable about the axis 20a in the plane perpendicular to the surface of the recording medium 2, the main pole 21a, when recording, is set so as to be in contact with the recording medium 2, as shown in FIG. 5, and a signal current for magnetic recording is allowed to flow through the winding 23a. As a result, the main pole 21a is magnetized by the current flowing through the winding 23a to develop the sharp perpendicular magnetic field at the tip end thereof, thus a magnetic layer 2a of the recording medium 2 is perpendicularly magnetized by the perpendicular magnetic field. To read the tape, main pole 21b is set downwardly by rotating the substrate 20 through 180° to contact the recording medium 2. In this state, as the medium 2 runs in the direction of arrow A, the main pole 21b is magnetized by the magnetic field developed by the perpendicular magnetization of the medium 2 and voltages induced by a change of the magnetization of the main pole 21b are picked up from the winding 23b.

Figure 6:
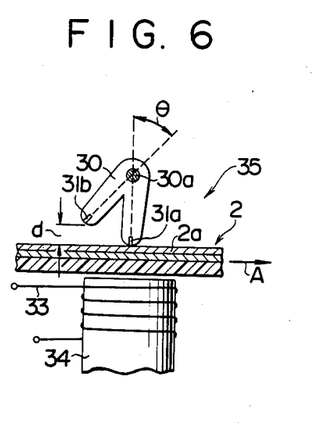
FIG. 6 is a front view of a perpendicular magnetic head according to a third embodiment of the present invention.

Since the magnetic head 25 does not employ an auxiliary pole, its structure is simpler than that of the magnetic head 15 of the first embodiment. In addition, the magnetic poles 21a, 21b can be arranged only on one side of the recording medium 2 and the loading mechanism for the recording medium 2 is simplified accordingly. A perpendicular magnetic head 35 according to a third embodiment of the present invention is shown in FIG. 6 and includes a substrate 30 with two arms which forms a V shape having an apex angle $\theta$. The arms are rotatable about an axis 30a in the plane perpendicular to a recording medium 2. A main recording pole 31a and a main reproducing pole 31b are located at the tip ends of the respective arms. The main pole 31a is made of a soft magnetic film with the high saturation magnetization and the main pole 31b is made of a soft magnetic film with the high initial permeability. An auxiliary pole 34 on which a winding 33 is provided is located on the other side of the tape and oppositely to the substrate 30.

With the magnetic head 35, during recording the main pole 31a is in contact with a magnetic layer 2a of the recording medium 2, as shown in FIG. 6 and during reproducing the main pole 31b is rotated through an angle of $\theta$ so as to be in contact with the magnetic layer 2a. Shifting between recording and reproducing positions is achievable by rotating the substrate 30 through the small shift angle.

Figure 7:
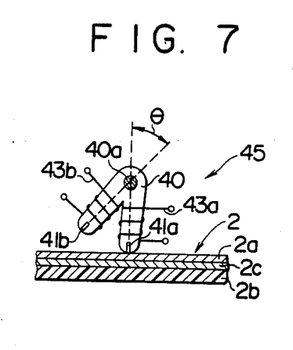
FIG. 7 is a front view of a perpendicular magnetic head according to a fourth embodiment of the present invention.

While the magnetic head 35 shown in FIG. 6 is an auxiliary pole exciting type head, it is possible to modify the magnetic head to a main pole exciting type perpendicular magnetic head 45 according to a fourth embodiment of the present invention shown in FIG. 7. The magnetic head 45 includes a substrate 40 in the same shape as the substrate 30 shown in FIG. 6 and a main recording pole 41a and a main reproducing pole 41b both of which have portions on the substrate 40 around which windings 43a, 43b are coiled, respectively. Accordingly, the magnetic head 45 is simple in construction as in the embodiment shown in FIG. 5 and permits a more simple loading mechanism for the recording medium 2.

It should be understood that in the magnetic heads 35, 45 shown in FIGS. 6, 7, a space gap of "d" of more than 10 μm between the magnetic layer 2a and the main pole not then in an operational position, will be sufficient for the operations. In addition, while the axis of rotation of the substrate in each embodiment shown in FIGS. 4 to 7, is arranged in the direction perpendicular to the running direction of arrow A of the recording medium 2, the directional relationship may be freely defined within 0 through 90°.

Figures 8, 9:
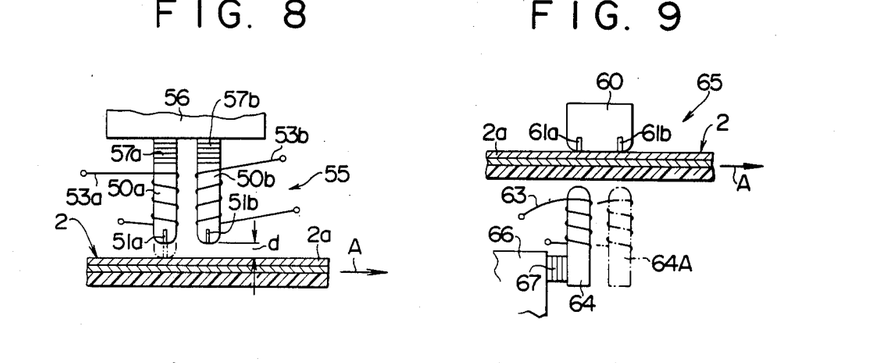
FIG. 8 is a front view of a perpendicular magnetic head according to a fifth embodiment of the present invention.
FIG. 9 is a front view of a perpendicular magnetic head according to a sixth embodiment of the present invention.

A perpendicular magnetic head apparatus 55 according to a fifth embodiment of the present invention is shown in FIG. 8 and includes a main pole exciting type magnetic head. The magnetic head 55 includes two vertically elongated substrates 50a, 50b which include the substrates 50a and 50b in pole 51a and a main reproducing head 51b at the lower tip ends thereof, respectively. The ends are vertically juxtaposed with the magnetic layer 2a of the recording medium 2 lying beneath them.

The substrates 50a, 50b are fixed to a mount 56 through the medium of a multi-layered piezo-electric members 57a, 57b which are made of PZT (Zirconium.-Lead Titanate) and the like and which are located at the upper end portions of the substrates 50a, 50b, respectively. Each of the main poles 51a, 51b is positioned so as to be in opposing relationship with the same track on the recording medium 2 while the latter runs in the direction of the arrow A. As in the foregoing embodiments, the main pole 51a is made of a soft magnetid film having the high saturation magnetization and the main pole 51b is made of a soft magnetic film having the high initial permeability.

During recording the piezo-electric substance member 57a is allowed to lengthen in the direction of its lamination, that is, in the longitudinal direction of the substrate 50a by applying a voltage thereto. As a result the main pole 51a extends to the phantom line and so is in contact with the magnetic layer 2a. During reproducing, the piezo-electric substance member 57b is allowed to lengthen in the longitudinal direction of the substrate 50a by applying a voltage thereto, resulting in that the main pole 51a makes contact with the magnetic layer 2a. It should be understood that to disengage one of the main poles 51a, 51b from the tape, a voltage of the polarity opposite to the voltage applied to the other pole to lengthen it may be applied to it. Thus, that piezo-electric member 57a or 57b contracts so as to be completely disengaged from the recording medium 2. In either case, an disengagement or separation distance d between the main pole not then in use and the surface of the magnetic layer 2a of more than 10 $\mu$m is produced. The magnetic head 55 has no mechanically driven part and therefore is durable.

A perpendicular magnetic head 65 according to a sixth embodiment of the present invention is shown in FIG. 9 and includes a main recording pole 61a made of a soft magnetic film having the high saturation magnetization and a main reproducing pole 61b made of a soft magnetic film having the high initial permeability, both of which are integrally mounted on a substrate 60 which is fixed to a mount (not shown). The main poles 61a, 61b are in abutment with the surface of a magnetic layer 2a of a recording medium 2 which is running in a direction of arrow A so as to scan the same track surface. An auxiliary pole 64 on which a winding 63 is provided is disposed at a position opposing the substrate 60 so that the recording medium 2 is interposed therebetween. The auxiliary pole 64 is fixed to a stationary member 66 through a multi-layered piezo-electric member 67 which is secured to one side of the base portion of the auxiliary pole 64. The auxiliary pole 64, when the piezo-electric substance member 67 is not energized, is located at a position opposing the main recording pole 61a. Under this situation, the recording operation is achieved such that the main recording pole 61a is magnetized by a signal current flowing through the winding 63 for magnetic recording to record signals on the recording medium 2. The reproducing operation is similar except that the piezo-electric substance member 67 elongates in the direction of its lamination by applying a voltage thereto so that the auxiliary pole 64 is at the position 64A and under the main reproducing head 61b. This position is shown in phantom in FIG. 9. The main reproducing pole 61b is then magnetized by the magnetic field developed by the perpendicular magnetization recorded on the magnetic layer 2a to obtain reproduced signals from the winding 63.

Figure 10:
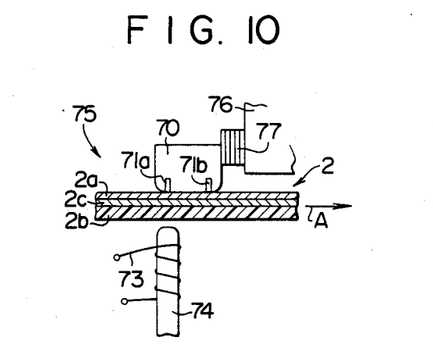
FIG. 10 is a front view of a perpendicular magnetic head according to a seventh embodiment of the present invention.

In the magnetic head 65 shown in FIG. 9, the main poles are stationary and the auxiliary pole 64 is displaceable along the running direction of the recording medium 2 to couple the main poles 61a, 61b during recording and reproducing, respectively. In a modified version thereof, a perpendicular magnetic head 75 according to a seventh embodiment of the present invention and as shown in FIG. 10, the auxiliary pole is stationary and main poles are displaceable in the direction of arrow A. Specifically, the magnetic head 75 has a substrate 70 which includes a main recording pole 71a and a main reproducing head 71b against a stationary auxiliary pole 74 on which a winding 73 is wound. The substrate 70 is fixed to a stationary member 76 through the medium of a multi-layered piezo-electric substance member 77 which is attached to the side plane of the substrate 70. With the structure, when recording the main pole 71a is in opposing relationship with the auxiliary pole 74, as shown in FIG. 10, with the piezo-electric substance member 77 deenergized to record information signals on the recording medium 2. When reproducing, the substance member 77 elongates in the direction of its lamination with the substance member 77 energized so that the main reproducing head 71b is brought into a position opposing the auxiliary pole 74 to read the perpendicular magnetization of the recording medium 2.

Figure 11:
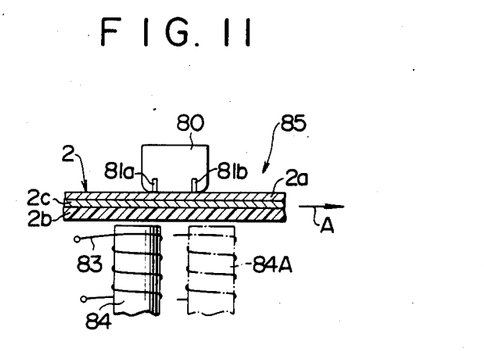
FIG. 11 is a front view of a perpendicular magnetic head according to an eighth embodiment of the present invention.

In the magnetic heads 65, 75 of FIGS. 9, 10, the auxiliary poles 64, 74 have a fine-pointed tip end so as to be opposed to the main poles 61a, 71a or 61b, 71b, so that it is possible to construct the magnetic heads 65, 75 in a greatly compact manner. Thickness of the auxiliary poles 64, 74 relative to that of a soft magnetic film of the main poles can vary from the thickness of the main poles or several decades layer. However, when thickness of the auxiliary pole is too small, it is difficult to bring the main and auxiliary poles into alignment. Taking this into consideration, the perpendicular magnetic head 85 according to a eighth embodiment of the present invention is shown in FIG. 11. The magnetic, head 85 employs, a conventionally sized, auxiliary pole 84 but on which a winding 83 is provided and a location of which pole is defined cleverly by the present invention. Specifically, during recording the right-hand end portion of an auxiliary pole 84 is in opposing relationship with a main recording pole 81a on a substrate 80. During reproducing the auxiliary pole 84 is shifted to position 84A shown in a phantom so that the left-hand portion of the auxiliary pole 84 is in opposing relationship with a main reproducing pole 81b. Accordingly, even with an auxiliary pole of a comparatively thick size in conventional use, the recording and reproducing operations can be normally performed without magnetically affecting the main pole not then used. It should be noted that as a means for shifting the auxiliary pole 84 between the recording and reproducing positions a multi-layered piezo-electric member or other mechanical shifting means may be utilized.

In the perpendicular magnetic heads according to the foregoing embodiments shown in FIGS. 4 to 11, soft magnetic films the two main poles are integrally held on the substrate such that they are inserted in the tip ends of the substrate. The thickness is that of the track width of the main poles so that the track width is formed in the direction of thickness of the substrate (see FIG. 4). However, the soft magnetic films of the main poles may be provided by a sputtering process or the like on one tip side of the substrate.

Figure 12:
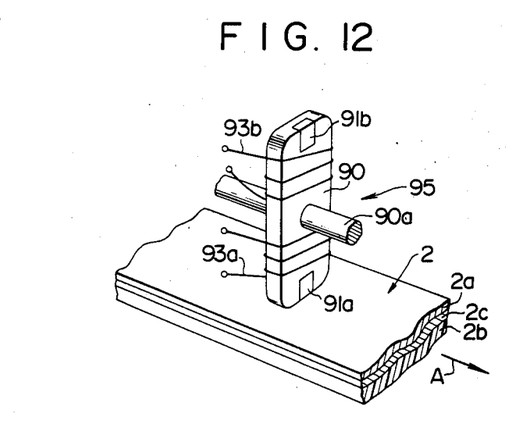
FIG. 12 is a perspective view of a perpendicular magnetic head according to a ninth embodiment of the present invention.

By way of example, a perpendicular magnetic head 95 according to a ninth embodiment of the present invention, which is a modification of the magnetic head 25 shown in FIG. 5, is shown in FIG. 12. A substrate 90 has an axis of rotation 90a which is parallel to a running direction A of a recording substrate 2 or perpendicularly to the rotational direction of the substrate 20 shown in FIG. 5. A main recording pole 91a made of a soft magnetic film having the high saturation magnetization and a main reproducing pole 91b made of a soft magnetic film having the high initial permeability are formed on the same plane of the substrate 90 at the upper and lower end regions thereof and symmetrically with respect to the axis 90a by a sputtering process or the like. Windings 93a, 93b are coiled around the substrate 90. With the magnetic head 95, since soft magnetic films forming the main poles 91a, 91b can be formed by a sputtering process or the like on one side of the substrate 90 which side is polished to a good accuracy in surface roughness, the azimuth error during recording and reproducing is largely reduced and thus accuracy is greatly improved compared with the magnetic head 25 shown in FIG. 5.

Figure 13:
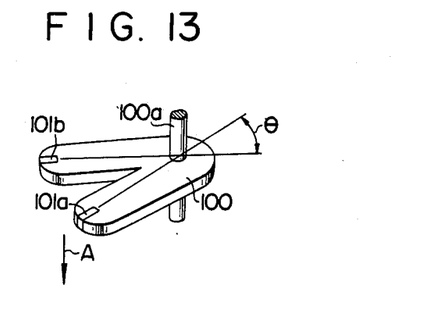
FIG. 13 to FIG. 17 are perspective views illustrating respective modified versions of a substrate having main recording and reproducing poles according to the present invention.

Similarly, a modification of the magnetic heads 35, 45 shown in FIGS. 6, 7 is shown in FIG. 13. Soft magnetic films of two main poles 101a, 101b are formed by a sputtering process or the like on one side of a substrate 100 which side is polished to a precise surface roughness. With this structure, the substrate 100 is rotated about an axis 100a during recording and reproducing to shift the main poles 101a, 101b through an angle $\theta$ in a direction of track width. Accordingly, when the track width is less than several tens μm, the rotational angle $\theta$ can be reduced correspondingly, resulting in further improvement of azimuthal accuracy.

Figure 14:
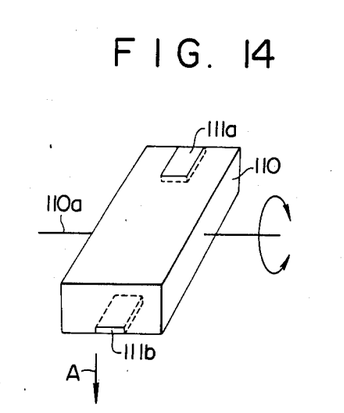

In addition to the foregoing, other modifications of the structure in which main poles are made of a soft magnetic film by a sputtering process or the like are possible. One example is shown in FIG. 14. A main recording pole 111a made of a soft magnetic film is provided at the center of an end edge of one surface of a substrate 110 in a pseudo-parallelepiped shaped block and a main reproducing pole 111b made of a soft magnetic film is provided at the center of the opposite end edge of the other surface of the substrate 110. An axis of rotation 110a which passes through the centers of opposite sides of the substrate 110. With the described structure, the main poles 111a, 111b are rotated to position about the axis 110a through 180° to shift between the recording and reproducing positions.

Figure 15:
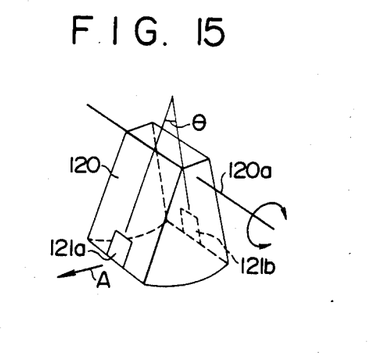

Another example is shown in FIG. 15. A main recording pole 121a and a main reproducing pole 121b are provided at the lower end edges of opposite surfaces of a fan shaped substrate 120. An axis of rotation 120a is provided so as to pass through the opposite sides The described structure is applicable to the magnetic head 35 shown in FIG. 6 as a modification thereof. It is simple and also reduces the rotational angle $\theta$.

Figure 16:
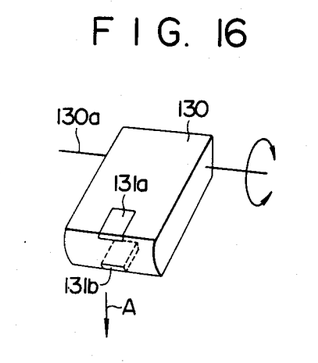

A further modification is shown in FIG. 16. The substrate 130 has opposite planes in parallel. A main recording pole 131a and a main reproducing pole 131b are provided on the lower ends of the opposite planes, respectively, so as to be adjacent the bottom plane along a circular arc shaped section and opposite to each other. With this structure, when the main pole 131a or 131b is brought into abutment with a recording medium by rotating the substrate 130 about the axis 130a, the main poles 131a, 131b are slightly inclined to the recording medium. However, since the rotational angle for shifting between recording and reproducing positions is reduced, a practical problem is not created.

Figure 17:
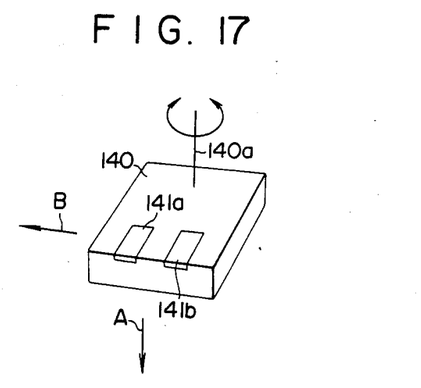

A still further modification is shown in FIG. 17. A main recording pole 140a and a main reproducing pole 141b are in parallel on one of two parallel planes of a substrate 140. For switching between the recording and reproducing, the substrate 140 is displaced in parallel to a surface of a recording medium 2 and in a direction perpendicular to a running direction A of the medium 2, that is, a direction of the track width shown by arrow B. As a means for displacing the substrate 140 in a direction of the arrow B the multi-layered piezo-electric member 77 shown in the embodiment of FIG. 10, for example, can be employed. Furthermore, it should be understood that an axis of rotation 140a may be provided on the substrate 140 so that the substrate 140 can be rotated about the axis 140a to switch between the recording and reproducing positions.

Figure 18:
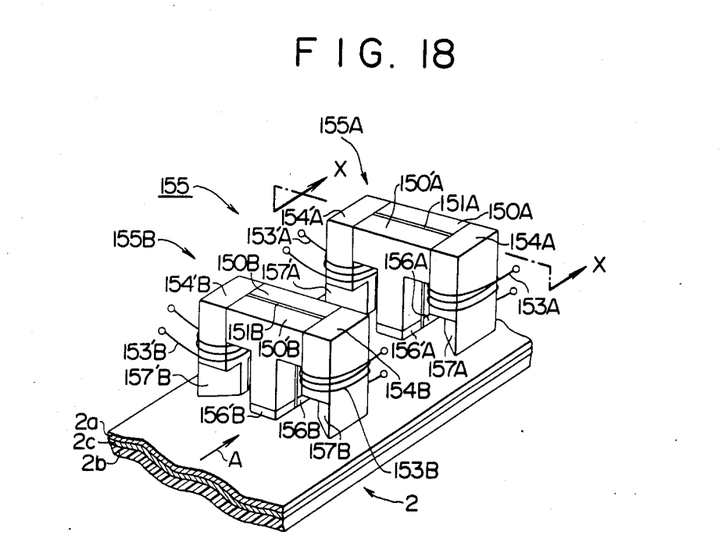
FIG. 18 is a perspective view of a perpendicular magnetic head according to a tenth embodiment of the present invention.

In a perpendicular magnetic head 155 according to a tenth embodiment of the present invention shown in FIG. 18, a perpendicular magnetic head which has been proposed by the inventors herein (Japanese Patent Application No. 198755/1983) is used, a pair of magnetic recording and reproducing heads 155A, 155B are arranged, spacedly, along the running direction A of a recording medium 2.

The magnetic recording head 155A comprises a main pole 151A which is disposed such that its tip end plane is in abutment with the surface of a magnetic layer 2a of the recording medium 2, auxiliary poles 154A, 154'A which are arranged on opposite sides of the main pole 151A in a direction perpendicular to the running direction A of the recording medium 2 and windings 153A, 153'A which are wound around the respective auxiliary poles 154A, 154'A. The main pole 151A is formed of a soft magnetic film having the high saturation magnetization and has a general T shape. The upper portion of the main pole 151A except for the vicinity of its tip end is held between substrates 150A, 150'A in a T shape which are formed of a magnetic material having the high permeability such as Mn (Manganese)-Zn (Zinc) ferrite in a thick manner. With the described structure, the magnetic reluctance of the main pole 151A is advantageously reduced by the substrates 150A, 150'A formed of the high permeability magnetic material. In addition, non-magnetic members 156A, 156'A, made for example of such as glass, are attached on both the tip end planes of the substrates 150A, 150'A which are adjacent to the tip end of the main pole 151A so that the contact resistance of the main pole 151A to the recording medium 2 is reduced to allow smooth contact therebetween.

Further, auxiliary poles 154A, 154'A having a substantially square pillar shape are secured to the right and left ends of the main pole 151A, respectively. The auxiliary poles 154A, 154'A have tapered portions 157A, 157'A for focusing magnetic flux which are formed, for example, at the lower end portions in contact with the recording medium 2 which portions are below body portions of the auxiliary poles 154A, 154'A on which windings 153A, 153'A are provided such that both the side planes of the auxiliary poles 154A, 154'A in opposing relationship with the main pole 151A are tapered toward the main pole 151A.

Figures 19, 20:
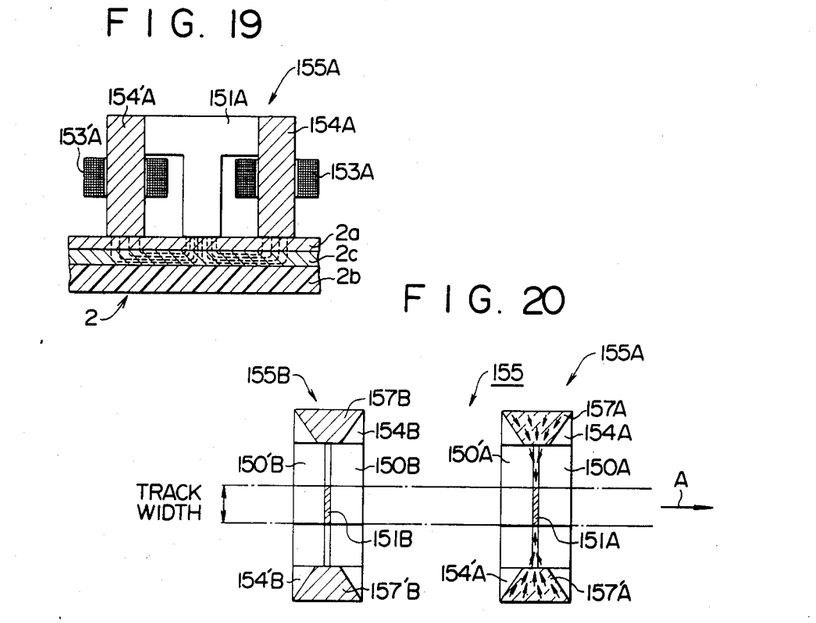
FIG. 19 is a sectional view taken along line X—X of the magnetic head shown in FIG. 18.
FIG. 20 is the bottom view from a recording medium side of the magnetic head shown in FIG. 18.

The end planes of the tapered portions 157A, 157'A in contact with the recording medium 2 have a trapezoid shape which is symmetrical with respect to the longitudinal direction of the recording medium 2, as shown in FIG. 20. With the auxiliary poles 154A, 154'A having respective tapered portions 157A, 157'A thus formed, magnetic flux which reaches the main pole 151A from the auxiliary poles 154A, 154'A through a high permeability layer 2c of the recording medium 2 is converged as shown in FIGS. 19, 20 to improve the recording density.

The magnetic reproducing head 155B has the same structure as that of the main pole 155A just described. Therefore, in the structure of the main pole 155B shown in FIGS. 18 to 20, corresponding parts are marked with identical reference numbers except that the suffix A is replaced by B. The magnetic heads 155A, 155B are distinguished in that while the main pole 151A of the magnetic head 155A is formed of a soft magnetic film having the high saturation magnetization, the main pole 151B of the magnetic head 155B is formed of a soft magnetic film having the high initial permeability.

Since the magnetic heads 155A, 155B, as shown in FIGS. 18 and 20, are juxtaposed in the longitudinal direction along the running direction A of the recording medium 2, both are on the same track (FIG. 20).

With the perpendicular magnetic head 155, during recording on the recording medium 2, current signal is impressed into the winding 153A, 153'A of the magnetic head 155A, magnetic flux from the auxiliary poles 154A and 154'A which have been activated by the current signal is converged in the tapered portions 157A, 157'A and reaches the main pole 151A through the magnetic layer 2a and the high permeability layer 2c of the recording medium 2 and further the magnetic layer 2a opposing the main pole 151A. At this time, residual magnetization is formed in the direction of thickness of the magnetic layer 2a opposing the main pole 151A and this magnetization is magnetically recorded perpendicularly to the tape's moving direction.

During reproducing, a change in magnetic flux representative of information recorded on the magnetic layer 2a is detected by the tip end of the main pole 151B of the magnetic head 155B and voltages corresponding to the change in magnetic flux are developed in the windings 153B, 153'B provided on the auxiliary poles 154B and 154'B which form a closed magnetic path. As a result, the recorded information is reproduced by sensing the sum of output voltages from the windings 153B and 153'B.

Thus, it will be understood that with the perpendicular magnetic head 155, the main poles 151A and 151B which are made of a soft magnetic film suitable for respective magnetic properties for recording and reproducing operations are separately utilized for respective exclusive uses so that the recording and reproducing operations can be effectively performed. Further, since the magnetic head 155, which is of the auxiliary pole exciting type, is everted on one side of the magnetic layer 2a the loading mechanism for the recording medium 2 and a head actuator or the like are simplified. Moreover although the magnetic heads 155A, 155B are simultaneously in abutment with the recording medium 2, separate magnetic paths are formed between the main pole 151A and the auxiliary poles 154A, 154'A and between the main pole 151B and the auxiliary poles 154B, 154'B. As a result, there is little magnetic interference between the magnetic heads 155A, 155B.

A modification of the perpendicular magnetic head 155 described above results when, a main pole exciting type magnetic head is constructed such that windings are wound around the main poles 151A, 151B, respectively, without providing the windings 153A, 153'A, 153B, 153'B on the auxiliary poles 154A, 154'A, 154B, 154'B.

Now, a soft magnetic film forming the main recording pole and another magnetic film forming the main reproducing pole in the perpendicular magnetic heads according to the foregoing embodiments is described. The soft magnetic films for the main recording and reproducing poles amorphous alloy materials. A variety of combinations in composition of the alloy materials are shown in Table 1, where x, y, z denote percentages on an atomic basis and $x+y+z=100\%$. Within parenthesis exhibits one or combination of more than two elements.

TABLE 1

| | Group of combinations in composition of the alloy materials |
|---|---|
| ① | Co x (Ti, Zr, Hf, Y) y (V, Cr, Mo, W, Ni) z |
| ② | Co x (Ti, Zr, Hf, Y) y (Nb, Ta) z |
| ③ | Co x (Fe, Mn) y (Nb, Ta) z |
| ④ | Co x (Fe, Mn) y (Si, B) z |
| ⑤ | Co x (Ti, Zr, Hf, Y) y (Si, B) z |

In Table 1, for example, Group ① comprises an alloy material including x atomic percentages of Co (cobalt), y atomic percentages of one or combination of more than two elements of Ti (titanium), Zr (zirconium), Hf (hafnium) and Y (yttrium) and z atomic percentages of one or combination of more than two elements of V (vanadium), Cr (chromium), Mo (molybdenum), W (tungsten) and Ni (nickel). Group ③ comprises an alloy material including x atomic percentages of Co, y atomic percentages or one or combination of two elements of Fe (iron) and Mn (manganese) and z atomic percentages of one or combination of two elements of Nb (niobium) and Ta (tantalum). Group ⑤ comprises an alloy material including x atomic percentages of Co, y atomic percentages of one or combination of more than two elements of Ti, Zr, Hf and Y and z atomic percentages of one or combination of two elements of Si (silicon) and B (boron).

Composition ratios of alloy materials in combination groups shown in Table 1 which are suitable for soft magnetic films for forming the main recording and reproducing heads are shown in Table 2.

TABLE 2

| | Use | |
|---|---|---|
| Group | Soft magnetic film of main recording pole | Soft magnetic film of main reproducing pole |
| ① | $80 \leq X \leq 95$ atomic % | $70 \leq X \leq 80$ atomic % |
| | $5 \leq Y \leq 12$ | $8 \leq Y \leq 15$ |
| | $0 \leq Z \leq 15$ | $5 \leq Z \leq 15$ |
| ② | $80 \leq X \leq 95$ | $70 \leq X \leq 80$ |
| | $0 \leq Y \leq 15$ | $8 \leq Y \leq 15$ |
| | $0 \leq Z \leq 20$ | $8 \leq Z \leq 15$ |
| ③ | $80 \leq X \leq 90$ | $70 \leq X \leq 80$ |
| | $0 \leq Y \leq 10$ | $1 \leq Y \leq 5$ |
| | $10 \leq Z \leq 20$ | $10 \leq Z \leq 20$ |
| ④ | $75 \leq X \leq 90$ | $65 \leq X \leq 75$ |
| | $0 \leq Y \leq 15$ | $3 \leq Y \leq 12$ |
| | $10 \leq Z \leq 25$ | $10 \leq Z \leq 25$ |
| ⑤ | $80 \leq X \leq 95$ | $70 \leq X \leq 80$ |
| | $0 \leq Y \leq 20$ | $5 \leq Y \leq 15$ |
| | $10 \leq Z \leq 25$ | $10 \leq Z \leq 25$ |

When formed of an amorphous alloy having composition ratios shown in Table 2, a main recording pole has the magnetostriction of zero and the high saturation magnetization and a main reproducing pole has the magnetostriction of zero and the high initial permeability. By way of example, in Table 2, for the soft magnetic film of main recording poles an alloy having a composition of the group ①  is used. It includes: atomic % of 80 to 95 of Co, atomic % of 5 to 12 of one or combination of more than 2 elements of Ti, Zr, Hf and Y and atomic % of 0 to 15 of one or combination of more than 2 elements of V, Cr, Mo, W and Ni is preferably selected. Such alloy materials having the indicated composition ratios have a magnetostriction of zero and a high saturation magnetization which is suitable for a main recording pole. If the soft magnetic film of main reproducing pole is formed of an alloy having a composition of the group ③, it includes: atomic % of 70 to 80 of Co, atomic % of 1 to 5 of one or combination of two elements of Fe and Mn and atomic % of 10 to 20 of one or combination of two elements of Nb and Ta is preferably selected. These alloy materials have composition ratios in which a magnetostriction of zero and a high initial permeability suitable for a main reproducing pole are obtained.

In the present invention, amorphous alloys of any combination of composition ratios shown in Table 2 can be used for forming the main recording and reproducing poles. According to experiments, for example, a composition ratio of atomic % of 91.6 of Co, atomic % of 2.7 of Zr and atomic % of 5.7 of Nb is preferable as the main recording pole and a composition ratio of atomic % of 78 of Co, atomic % of 11 of Zr and atomic % of 11 of Mo is preferable as the main reproducing pole.

It is to be also noted that main recording and reproducing poles utilized in the present invention are easily formed by sputtering alloy materials shown in Tables 1 and 2 with less than 1 μm film thickness, for example.

What is claimed is:

1. A perpendicular magnetic head comprising:
   a first main pole for recording information on a magnetic recording medium, said main pole comprising a soft magnetic film having a first relatively high saturation magnetization and a first relatively low initial permeability; and
   a second main pole for reproducing information from the magnetic recording medium, said second main pole comprising a soft magnetic film having a second relativley high initial permeability which is substantially higher than said first initial permeability of said first main pole and having a second relatively low saturization magnetization which is substantially lower than said first saturization magnetization of said first main pole, said second pole being spaced from said first main pole and said first and second main poles being formed on a single substrate, said substrate being rotaably supported around an axis penetration therethrough.

2. A perpendicular magnetic head in accordance with claim 1, in which said substrate is rotatably supported on a shaft.

3. A perpendicular magnetic head in accordance with claim 1, in which said axis extends along a direction in which said magnetic recording medium is moved past said head.

4. A perpendicular magnetic head in accordance with claim 1, in which said first and second main poles are located symmetrically with respect to said axis.

5. A perpendicular magnetic head in accordance with claim 1, in which said first and second main poles are angularly displaced from one another at a predetermined angle measured between lines extending from said axis to said poles.

6. A perpendicular magnetic head in accordance with claim 5, in which said predetermined angle is an acute angle.

7. A perpenciaular magnetic head in accordance with claim 1, in which said substrat includes a first arm part for supporting said first main pole and a second arm part for supporting said second main pole, said first and second arm parts extending from said axis and being angularly spaced form one another by a predetermined angle therebetween.

8. A perpendicular magnetic head in accordance with claim 1, in which said substrate has a general parallelepiped shape.

9. A perpendicular magnetic head in accordance with claim 1, in which said axis extends generally perpendicularly with respect to a direction in which said magnetic recording medium is moved past said head.

10. A perpendicular magnetic head in accordance with claim 1, in which said substrate is selectively rotatable to cause one of said main poles to contact said magnetic recording medium.

11. A perpendicular magnetic head in accordance with claim 10, in which said substrate is rotatable by about 180°.

12. A perpendicular magnetic head comprising:
    a first main pole for recording information on a magnetic recording medium, said main pole comprising a soft magnetic film having a first relatively high saturation magnetization and a first relatively low initial permeability; and
    a second main pole for reproducing information from the magnetic recording medium, said second main pole comprising a soft magnetic film having a second relatively high initial permeabilty which is substantially higher than said first initial permeability of said first main pole and having a second relatively low saturization magnetization which is substantially lower than said first saturization magnetization of said first main pole, said second pole being spaced from said first main pole, and further comprising a first substrate, said first main pole being disposed on said first substrate and first moving means for moving said first substrate toward and away from said magnetic recording medium, a second substrate, said second main pole being disposed on said second substrate and second moving means for moving said second substrate toward and away from said magnetic recording medium.

13. A perpendicular magnetic head in accordance with claim 12, in which at least one of said moving means comprises a piezo-electric substance.

14. A perpendicular magnetic head comprising:
    a first main pole for recording information on a magnetic recording medium, said main pole comprising a soft magnetic film having a first relatively high saturation magnetization and a first relatively low initial permeability; and
    a second main pole for reproducing information from the magnetic recording medium, said second main pole comprising a soft magnetic film having a second relatively high initial permeability which is substantially higher than said first initial permeability of said first main pole and having a second relatively low saturization magnetization which is substantially lower than said first saturization magnetization of said first main pole, said second pole being spaced from said first main pole and said first and second poles being rotatably supported around an axis penetration therethrough.

15. A perpendicular magnetic head in accordance with claim 14, in which said head further comprises an auxiliary pole associated with said main poles.

16. A perpendicular magnetic head in accordance with claim 15, further comprising moving means for moving said auxiliary pole between a first and a second position in which said auxiliary pole is coupled to one of said main poles, said first position corresponding to said first main pole and said second position corresponding to said second main pole.

17. A perpendicular magnetic head in accordance with claim 16, in which said moving means comprises a piezo-electric substance.

18. A perpendicular magnetic head in accordance with claim 15, further comprising a single substrate, said first and second main poles being formed on said substrate and moving means for moving said single substrate between first and second positions, at said first said first position said first main pole lying oppositely to said auxiliary pole and at said second position said second main pole lying oppositely to said auxiliary pole.

19. A perpendicular magnetic head in accordance with claim 18, in which said moving means comprises a piezo-electric substance.

20. A perpendicular magnetic head in accordance with claim 14, further comprising a winding for supplying electrical energy for recording information on said magnetic recording medium and for sensing recorded information from said magnetic recording medium.

21. A perpendicular magnetic head in accordance with claim 20, in which said winding is wound around said auxiliary pole.

22. A perpendicular magnetic head in accordance with claim 20, in which said winding includes a first winding section which is wound about said first main pole and a second winding section which is wound around said second main pole.

23. A perpendicular magnetic head in accordance with claim 14, further comprising first and second auxiliary poles, said first main pole being formed as a block with said first auxiliary pole, and said second main pole being formed as a block with said second auxiliary pole.

24. A perpendicular magnetic head in accordance with claim 19, in which said soft magnetic film comprised in said first and second main poles is comprised of amorphous alloy materials.

25. A perpendicular magnetic head in accordance with claim 24, in which said amorphous alloy materials comprise a composition of a first cobalt material, a second material selected as at least one elements from the group of Ti, Zr, Hf, and Y, and a third material selected as at least one from the group of elements V, Cr, Mo, Y, W, and Ni.

26. A perpendicular magnetic head in accordance with claim 24, in which said amorphous alloy materials comprise a composition of a first cobalt material, a second material selected as at least one element from the group of Ti, Zr, Hf, and Y, and a third material selected as at least one from the group of elements Nb and Ta.

27. A perpendicular magnetic head in accordance with claim 24, in which said amorphous alloy material comprise a composition of a first cobalt material, a second material selected as at least one element from the group of Fe and Mn, and a third material selected as at least one from the group of elements Nb and Ta.

28. A perpendicular magnetic head in accordance with claim 24, in which said amorphous alloy material comprise a composition of a first cobalt material, a second material selected as at least one element from the group of Fe and Mn, and a third material selected as at least one from the group of elements Si and B.

29. A perpendicular magnetic head in accordance with claim 24, in which said amorphous alloy materials comprise a composition of a first cobalt material, a second material selected as at least one element from the group of Ti, Zr, Hf, and Y, and a third material selected as at least one from the group of elements Si and B.

30. A perpendicular magnetic head in accordance with claim 14, in which said first and second main poles are formed on a single substrate.

* * * * *